3,515,442
LOCK FOR HYDRAULIC BRAKES OF VEHICLES
Lawrence C. Whittemore, 19641 Waterbury Lane,
Huntington Beach, Calif. 92646
Continuation-in-part of application Ser. No. 742,863,
July 5, 1968. This application Jan. 21, 1969, Ser.
No. 792,621
Int. Cl. B60t 17/16
U.S. Cl. 303—89      3 Claims

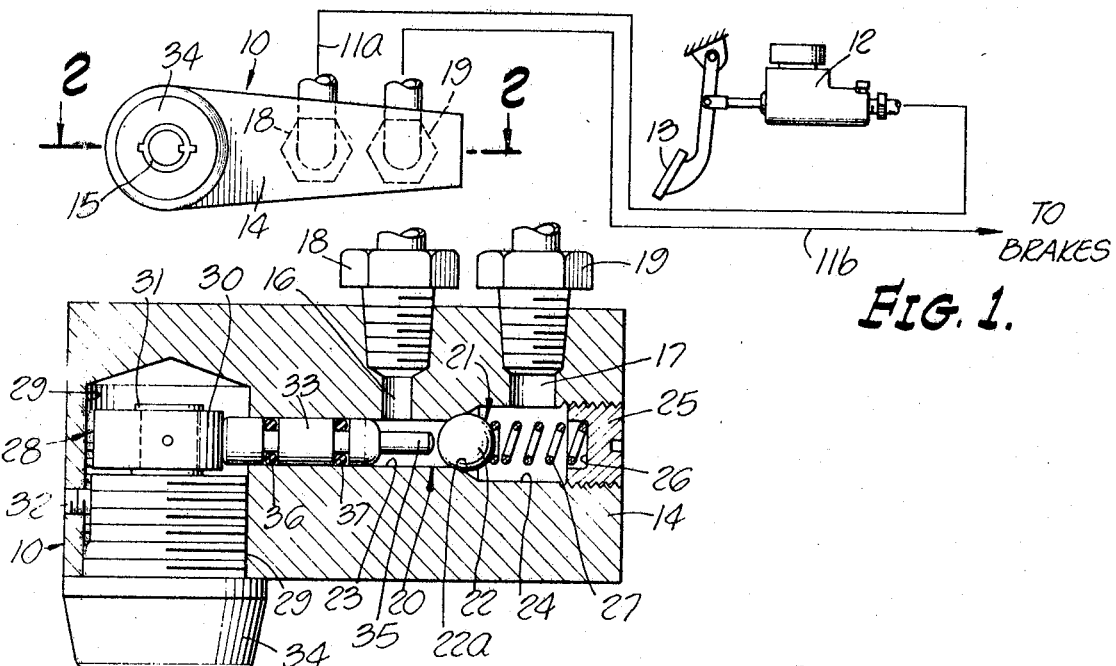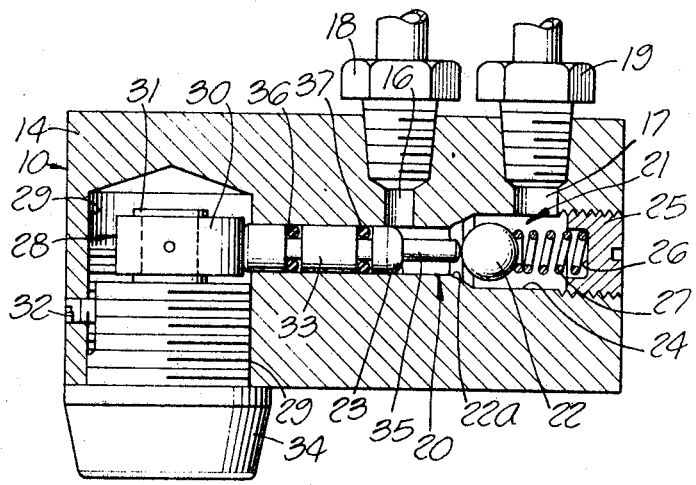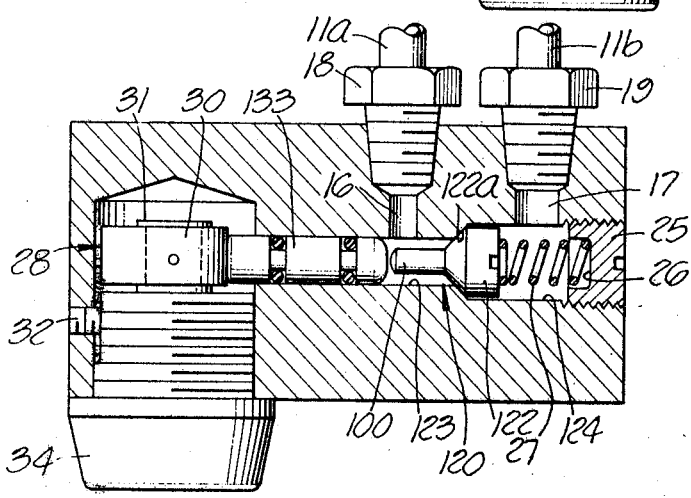

ABSTRACT OF THE DISCLOSURE

A lock mechanism for vehicles having a hydraulic brake system includes a cam actuated valve which, when closed, retains fluid under pressure in the individual brake cylinders to prevent movement of the vehicle.

---

This present application is a continuation-in-part of my application Ser. No. 742,863, filed July 5, 1968, now abandoned.

This invention relates to a valve or lock mechanism for maintaining fluid in a hydraulic system under pressure and more particularly relates to a device for locking the brakes in a vehicle having a fluid operated brake system.

A major concern of automobile owners is the theft of the automobile itself. Removing the keys from the ignition and otherwise locking the car has proved to be insufficient to prevent or deter these thefts. The present invention is directed to this problem. It is desirable that such a device be operable without the use of electrical circuit which can be avoided by the use of a jumper circuit or otherwise defeated. It is also desirable that the lock mechanism be inaccessible to avoid unlocking other than by the means contemplated.

Thereafter, it is a primary object of this invention to provide a simple, effective and economical form of brake locking unit which can be locked or unlocked only by the use of a proper key. In accordance with this object the device is capable of being connected into the standard hydraulic brake system of the type used in present-day automobiles for control of the hydraulic system. A further object of this device is that the hydraulic brake system be controlled by a cam actuated valve completely contained within an inaccessible unit and which can be actuated only by the means of a particular key.

Other objects and advantages of the invention, as well as the details of an illustrative embodiment, will be more fully understood by the following detailed description of the drawings.

In the drawings:

FIG. 1 is a schematic view of the device shown in connection with the master cylinder of a hydraulic brake system.

FIG. 2 is a sectional plan view taken along the lines 2—2 of FIG. 1 and shows the device in a closed or locked position.

FIG. 3 is a sectional plan view similar to FIG. 2 showing the device in an open or unlocked position.

FIG. 4 is a sectional plan view illustrating an alternative embodiment of the invention, shown in closed position.

Briefly, the invention includes a relatively small and compact housing capable of being connected into the hydraulic brake system whereby all fluid passing between the master cylinder and the individual brake cylinders must pass through the housing. Within the housing is a valve adapted to prevent fluid from returning to the master cylinder from the individual brake cylinders and to maintain that fluid under pressure. Also included within the housing is a cam mechanism which actuated the valve and in turn is operated by a releasable key.

The lock mechanism or device, generally designated 10, is adapted to be connected into the line or piping, represented by the lines 11a and 11b, of a hydraulic brake system which communicates fluid between a master cylinder or a source of fluid under pressure 12 and the individual brake cylinders (not shown) normally associated with the wheels of the vehicle. Movement of the fluid from the master cylinder 12 to the individual cylinders is normally initiated by a brake pedal 13 as shown in FIG. 1.

The device 10 includes a solid housing or body member 14 which is preferably made of aluminum alloy. As shown in FIG. 1, fluid from the master cylinder 12 enters the housing 14 from the line 11a through a port or opening 16 and fluid passes from the housing 14 to the line 11b and the brakes through a port or opening 17. As shown in the drawings, it is desirable that the diameter of port 17 be greater than the diameter of port 16. Threaded connectors 18 and 19 connect the line or conduit 11a and 11b to the ports 16 and 17, respectively. A passage 20 within the housing 14 provides for communication of the fluid between the ports 16 and 17 and through the housing. Generally contained within the passage 20 and between the ports 16 and 17 is a valve mechanism 21.

The valve mechanism 21 includes a plug 22 preferably in the form of a ball. An annular seat 22a is formed at the transition in the passage 20 between a small diameter bore 23 and a large diameter bore 24 in axial alignment therewith. Preferably, the annular seat 22a for the ball plug 22 is formed by a coining operation accomplished by forcing the hard metal ball plug 22 into the softer metal of the housing 14 at the transition in the passage 20. The formation of the seat in this manner insures proper seating at the plug 22. The end of the large diameter bore 24 of the passage 20 is closed by a cup-shaped closure 25 threadably connected to the housing 14 and having a recess 26 which forms a retainer for a biasing spring 27 mounted between the cap 25 and the ball plug 22. The spring 27 acts on the ball plug 22 to urge it against the coined annular seat 22a.

A cam 28 is rotatably mounted within a transverse bore 29 in the housing 14. This transverse bore 29 intersects the bore 23 at right angles. The cam has a surface 30 and is fixed on a shaft 31 which extends within the bore 29. A cam follower 33 having one end slidably contacting the cam surface 30 is positioned for axial movement within the small diameter bore 23 of the passage 20 which extends between the bore 29 and the annular seat 22a. In the preferred embodiment the other end of the cam follower 33 includes a reduced portion or stem 35 which is adapted to engage the ball plug 22. A pair of O-rings 36 and 37 mounted concentrically on the cam follower 33 prevent leakage of fluid from the passage 20 into the transverse bore 29.

The end of the bore 29 is enclosed by a cap 34 which is threadably connected to the housing 14 to prevent any tampering of the cam mechanism 28. The cap 34 is threaded into the bore 29 and carries the shaft 31 and rotary cam 28. Removal of the cap 34 is prevented by a lock screw 32. The cap 34 is preferably accessible from the driver's seat and includes a key opening 15 which receives a particular key (not shown). Conventional lock mechanism is provided within the cap 34 so that turning of the key within the key socket 15 is effective to turn the shaft 31 and cam 28. It should be recognized that the key opening can be in close proximity to the key opening for the ignition key or one key opening can be provided for both the lock mechanism and ignition system.

The alternative embodiment as shown in FIG. 4 is identical to the preferred embodiment except for the plug and cam follower. As shown in FIG. 4, the plug 122 is of the poppet type and is tapered to engage the seat 122a between the small diameter bore 123 and large diameter bore 124 of the passage 120. The plug 122 includes a stem portion 100 which is similar to the stem portion of the cam follower in the preferred embodiment and which has been eliminated from the cam follower 133 in the modification. Moreover, in this embodiment the stem 100 is adapted to be operably engaged by the cam follower 133.

Both the preferred embodiments as shown in FIGS. 2 and 3 and the modification as shown in FIG. 4 operate in the same manner. The brake pedal 13 as shown in FIG. 1 is pushed by the vehicle operator to operate the brakes in the usual manner except that the hydraulic fluid passes through the locking mechanism or device 10 before continuing on to the brake cylinders.

When the vehicle is to be locked, the key is inserted into the key opening 15 and engages the cam shaft 31. The key is turned in an indicated direction to turn the cam 28 which allows the cam follower 33 to move axially away from and out of engagement with the plug 22. The biasing spring 27 then forces the ball plug 22 onto the annular seat 22a as shown in FIG. 2. In this position fluid flows from the master cylinder 12 into the port 16 until sufficient pressure from this fluid acts on the plug 22 to unseat the plug and pass fluid around the plug and on into the brake cylinders. Hydraulic fluid cannot, however, when the plug has been seated, return from the individual brake cylinders and the plug 22. Any pressure of hydraulic fluid in the system attempting to return after release of the brake pedal acts only to more firmly seat the ball. If the brake pedal is further operated under these circumstances, additional fluid may be forced into the line 11b between the valve 21 and the individual brake cylinders to more firmly lock the brake.

FIG. 3 shows the locking mechanism or device in an open position. To unlock the mechanism and to allow the hydraulic fluid to return from the individual brake cylinders to the master cylinder the key is again inserted and turned in an opposite direction to similarly turn the cam 28 which moves the cam follower 33 axially in the passage 20 against the plug 22 to unseat the plug. The cam follower then maintains the plug in an unseated position to allow fluid to flow around the plug and between the ports 16 and 17, for normal operation of the brake system.

The structure and arrangement of this device is such that it is tamper-proof and provides a maximum of safety and security. Moreover, cap 25 and the lock screw 32 can be sealed to prevent access thereto. In the event, however, that an unauthorized person should succeed in removing the cam, then the device simply locks the hydraulic system since the plug moves against the seat under the force of the spring to close the valve to prevent normal operation of the hydraulic system and maintain the brakes in a locked condition.

I claim:

1. A locking device for a vehicle having hydraulic brakes actuated from a master cylinder assembly, comprising in combination: a housing having a first bore and a second bore of larger size in axial alignment therewith and intersecting the first bore, a valve seat at the junction of said bores, a movable valve element within the second bore engageable with said seat, resilient means within the second bore urging the valve element into contact with the seat, the housing having a third bore intersecting the first bore at right angles and at a location remote from the seat, a key-operated rotary cam axially insertable into the third bore, a cam follower slidably mounted in the first bore and operable to move the valve element off the seat upon turning of the cam, the cam follower being axially insertable through the second bore into the first bore for contact with said rotary cam, means sealing the cam follower with respect to the first bore, means on the housing for establishing communication between the first bore and the master cylinder assembly, and means on the housing for establishing communication between the second bore and the vehicle brakes.

2. The device of claim 1 wherein the valve element comprises a ball, and wherein the seat is coined to conform to the ball surface.

3. The device of claim 1 wherein the valve element is a poppet type valve having a projecting stem adapted for contact with the cam follower.

References Cited

UNITED STATES PATENTS

| | | | |
|---|---|---|---|
| 1,903,190 | 3/1933 | Neldner | 303—89 X |
| 2,585,711 | 2/1952 | Whitney et al. | 303—89 X |
| 2,886,060 | 5/1959 | Highland et al. | |
| 2,964,141 | 12/1960 | Schlumbrecht. | |
| 3,322,246 | 5/1967 | Noguchi. | |
| 3,386,777 | 6/1968 | Cords | 303—89 |

FOREIGN PATENTS 834,189   3/1952   Germany.

MILTON BUCHLER, Primary Examiner

J. J. McLAUGHLIN, Jr., Assistant Examiner

U.S. Cl. X.R.

60—54.5; 137—598; 180—114; 188—152; 192—3